(12) United States Patent
Ehresmann et al.

(10) Patent No.: US 9,576,416 B2
(45) Date of Patent: Feb. 21, 2017

(54) MAGNETIC AUTHENTICITY FEATURE

(71) Applicant: Universitaet Kassel, Kassel (DE)

(72) Inventors: Arno Ehresmann, Zweibruecken (DE); Dieter Engel, Frankfurt (DE)

(73) Assignee: Universitaet Kassel, Kassel (DE)

( * ) Notice: Subject to any disclaimer, the term of this patent is extended or adjusted under 35 U.S.C. 154(b) by 0 days.

(21) Appl. No.: 14/386,926

(22) PCT Filed: Mar. 22, 2013

(86) PCT No.: PCT/EP2013/056094
§ 371 (c)(1),
(2) Date: Sep. 22, 2014

(87) PCT Pub. No.: WO2013/139969
PCT Pub. Date: Sep. 26, 2013

(65) Prior Publication Data
US 2015/0102108 A1    Apr. 16, 2015

(30) Foreign Application Priority Data

Mar. 22, 2012   (DE) .................. 10 2012 204 660

(51) Int. Cl.
*G07D 7/04*       (2016.01)
*H01F 10/32*      (2006.01)
(Continued)

(52) U.S. Cl.
CPC .............. *G07D 7/04* (2013.01); *B32B 15/04* (2013.01); *B32B 15/043* (2013.01); *B32B 15/12* (2013.01);
(Continued)

(58) Field of Classification Search
CPC ...... G07D 7/04; G06K 1/12; G06K 19/06196; G06K 7/082; H01F 41/14; H01F 10/3218; H01F 10/3268; H01F 41/308; B32B 15/12; B32B 15/043; B32B 15/04; B32B 2605/00; B32B 2250/05; B32B 2307/20; B42D 25/29; B42D 25/00; A61J 2205/60
See application file for complete search history.

(56) References Cited

U.S. PATENT DOCUMENTS 4,081,132 A    3/1978    Pearce
4,960,651 A    10/1990   Pettigrew et al.
(Continued)

FOREIGN PATENT DOCUMENTS

EP    2 055 501 A2    5/2009
GB    1 529 937 A    10/1978

OTHER PUBLICATIONS

M. Urbaniak, et al., "Domain structure and magntoresistance of NiFe/Au/Co/Au multilayers with perpendicular anisotropy", Phys. Stat. Sol. (c) 3, No. 1, 57-60 (2006).

*Primary Examiner* — Sonji Johnson
(74) *Attorney, Agent, or Firm* — Modern Times Legal

(57) ABSTRACT

The invention relates to a magnetic multilayer system (1) which is arranged on a substrate (6) which is made of a material from the group consisting of a plastic from the group of polymers, metal, metal alloy and paper and/or which is at least one element from the group consisting of a document and packaging. The invention further relates to packaging which comprises such a magnetic multilayer system (1). According to the invention, the multilayer system (1) is used for proving the authenticity of an object. Likewise according to the invention are a method for marking an object with a magnetic multilayer system for proving the authenticity of an object and a method for reading a magnetic multilayer system for proving the authenticity of an object.

13 Claims, 2 Drawing Sheets

(51) Int. Cl.
*B42D 25/29* (2014.01)
*B42D 25/00* (2014.01)
*G06K 1/12* (2006.01)
*G06K 7/08* (2006.01)
*G06K 19/06* (2006.01)
*H01F 41/14* (2006.01)
*B32B 15/04* (2006.01)
*B32B 15/12* (2006.01)
*A61J 1/03* (2006.01)
*H01F 41/30* (2006.01)

(52) U.S. Cl.
CPC ............... *B42D 25/00* (2014.10); *B42D 25/29* (2014.10); *G06K 1/12* (2013.01); *G06K 7/082* (2013.01); *G06K 19/06196* (2013.01); *H01F 10/3218* (2013.01); *H01F 41/14* (2013.01); *A61J 1/035* (2013.01); *A61J 2205/60* (2013.01); *B32B 2250/05* (2013.01); *B32B 2307/20* (2013.01); *B32B 2605/00* (2013.01); *B42D 2033/16* (2013.01); *H01F 10/3268* (2013.01); *H01F 41/308* (2013.01)

(56) References Cited

U.S. PATENT DOCUMENTS

| | | |
|---|---|---|
| 7,055,758 B2 | 6/2006 | Morenzin et al. |
| 2002/0039265 A1* | 4/2002 | Yuasa .................... B82Y 10/00 |
| | | 360/322 |
| 2003/0107832 A1* | 6/2003 | Morenzin et al. .............. 360/40 |
| 2006/0209472 A1* | 9/2006 | Koui ...................... B82Y 10/00 |
| | | 360/324.1 |

* cited by examiner

MAGNETIC AUTHENTICITY FEATURE

FIELD OF THE INVENTION

The invention relates to a multilayer system, comprising a plurality of magnetic layers which are arranged one upon another and of which at least one layer is ferromagnetic and a ferromagnetic layer has a large number of biased domains with asymmetrical remagnetisation properties, the multilayer system being arranged on a substrate. It further relates to a use of a magnetic multilayer system, comprising a plurality of magnetic layers arranged one upon another on a substrate, for proving the authenticity of an object. Finally, the invention relates to a method for marking an object with a magnetic multilayer system for proving the authenticity of an object and to a method for reading a magnetic multilayer system for proving the authenticity of an object.

BACKGROUND OF THE INVENTION

WO 01/63554 A2 and US 2003/0107832 A1 teach a marking device for the identification of objects. A carrier film made of polyester is firstly vapour-deposited with a first layer made of NiO and subsequently with a second layer made of NiFe. The marking may be used, instead of a magnetic strip, on cheque cards, credit cards, access cards, electronic keys or the like for checking authenticity.

From A. Ehresmann et al., "On the origin of ion bombardment induced Exchange Bias modifications in polycrystalline layers" 2005, J. Phys. D. 38, 801, there is known a multilayer system having a plurality of magnetic layers arranged one upon another which comprises a ferromagnetic layer having a large number of biased domains with asymmetrical remagnetisation properties.

U.S. Pat. No. 4,960,651 discloses magnetic elements containing an object which has a substrate and a thin coating with an amorphous magnetic material. The object can be used as an anti-theft marking.

From DE 196 04 746 A1 there is known a security element for electronic article protection. It solves the problem of modifying a known security element, composed of a plurality of magnetic materials, such that it is detected by a harmonic detection system. This is done by providing a material with a high Barkhausen effect, which is arranged relative to a soft magnetic material in such a way that the two can be coupled to one another via their stray fields, and by providing a medium-hard or hard magnetic material which biases the material with the high Barkhausen effect.

CA 2 451 548 discloses an authenticity feature, in particular a security thread for banknotes, which has optical, electronic and magnetic security features. The security features are applied in a manner overlapping in layers and cannot be optically distinguished from one another. The magnetic security feature can be applied by magnetic ink, and individual regions forming the magnetic security element may differ in their magnetic remanence or in their coercive field strength. The different types of magnetic regions can therefore be distinguished in identifying machines through their different magnetic properties. The different magnetic properties of the regions may be caused by different magnetic materials, by varying the amount of material and/or the pigment distribution, the term pigment distribution referring, for example, to the pigment size or the density distribution of the pigments. As materials, hard and soft magnetic materials are equally suitable.

From US 2008/0193639 A1 there is known a method for marking composite materials. A marking is applied by means of magnetically doped ink between layers of the composite material. The marking can be read by suitable reading devices for magnetic markings, although it is located between two layers of the composite material and is thus invisible or at least hidden to the eye.

U.S. Pat. No. 7,159,779 B2 discloses a barcode scanning machine with at least two cameras. The at least two cameras scan one after the other a barcode of sheets guided past them. A controller receives signals from the first and from the second barcode scanner and interprets them by means of a predetermined algorithm. The algorithm can be selected, so that different levels of reliability checking are provided.

From DE 600 03 067 T2 there is known a security system for the protection of various articles, and a method for reading a code marking. A main feature of the invention is to provide an appropriate system comprising a magnetic read-only pattern with a high density which is not visible to an individual's eyes and has a reading head suitable for reading this pattern. In addition, another feature of the invention is to provide a reading head which is designed to be adapted to the unique response characteristics of the material of the code pattern. The reading head is provided with magnetic means, so that an effective response of the reading head occurs only in a narrow zone. The magnetic elements are preferably glass-coated microwires made of a soft magnetic material having a very low remanence. The density of the microwire pattern is considerably higher than that which is obtained with known magnetic materials such as magnetic inks. The code patterns formed by the microwires cannot be read with known readers, because the sensing range of known readers is much larger than the distance between the microwire pieces.

DE 103 14 631 A1 discloses a plane sheet material with individual information. The sheet material or the sheet has magnetisable particles, and individual information is incorporated in the sheet material. Substantially unchangeable individual information is stored on the sheet material by the manufacturer by means of the magnetisable particles, and moreover incorporated in the sheet in encrypted form as check information. The individual information and the corresponding check information can be checked for a match using only a corresponding key. The storing of the individual information can be carried out such that while being easily readable it is substantially unchangeable in content, which increases the degree of security against counterfeiting. A suitable testing device comprises decryption software which enables detection of the match between individual and check information.

The Object Underlying the Invention

The object underlying the invention is to provide a magnetic multilayer system which is further developed over the prior art to put a magnetic multilayer system to a novel use, and to provide novel methods including a magnetic multilayer system.

Solution According to the Invention

The reference symbols in all the claims do not have any limiting effect, but rather are intended merely to improve their readability.

The object underlying the invention is achieved according to the invention by a multilayer system as defined in claim 1, by a method for marking an object with a magnetic multilayer system as defined in claim 13 and by a method of reading a magnetic multilayer system as defined in claim 15.

A magnetic multilayer system in the meaning of the invention comprises a plurality of layers laid one upon another of different or the same magnetic materials.

Biased domains in the meaning of the invention are regions of a magnetic layer delimited from one another, in each of which regions there is a respective single bias with a specific magnitude and in a specific direction.

By an asymmetrical remagnetisation property there is understood in the meaning of the invention the property of a magnetic domain that a unidirectional anisotropy of the magnetisability exists therein.

Polymers in the meaning of the invention are plastics which are produced by polymerisation of monomers. Accordingly, polycondensates, i.e. plastics produced by polycondensation, or polyadducts, i.e. plastics produced by polyaddition, are not polymers.

A metal substrate in the meaning of the invention is a base, to which the multilayer system is connected and which is composed of a metal. A metal alloy as a substrate in the meaning of the invention is a base, to which the multilayer system is connected and which is produced from a mixture of a metal and at least one further material. According to the invention, the aforementioned features may occur in each case alone or in combination with one another.

Hitherto, plane silicon or glass substrates have served as carriers of such magnetic multilayer systems, for example specimen slides made of glass which are known from laboratories. Owing to the idea of applying the multilayer system to other substrates which are made of a plastic from the group of polymers, paper, metal or a metal alloy, hitherto unknown possible uses for such a multilayer system are achieved.

Where the substrate is a document, there can result the advantage that the proof of authenticity of the document can be improved. Thus, for example, a proof of authenticity of documents can be provided which is particularly secure against counterfeiting and inconspicuous.

Packaging in the meaning of the invention is packaging according to the legal definition of Section 3 of the German Packaging Ordinance (VerpackV) and Annex V thereof, in each case in the version valid at the application date. This definition is part of the disclosure of the application. The packaging can be improved by comprising a magnetic multilayer system.

Another aspect of the invention is namely the use of a magnetic multilayer system, comprising a plurality of magnetic layers arranged one upon another, for proving the authenticity of an object. Proving the authenticity in the meaning of the invention is such a process in which, to confirm the authenticity of the object, the magnetic multilayer system is written to, at a later point in time is read from and the information obtained by the reading confirms the authenticity of the object by comparison with a reference or a check value.

A magnetic multilayer system provides an information store which enables the proving of the authenticity of physical objects and can have increased security against counterfeiting. Many industrial products consist of the four substrate types mentioned, but also of substrates already known, so that now all of these can be marked with characteristic information associated with it. Since the production of, and the specific, reproducible writing to, magnetic multilayer systems for proving the authenticity of an object may be problematical for the non-professional, advantageously an increased security against counterfeiting for the magnetic proof of authenticity can be achieved.

In addition, by using the multilayer system for proving the authenticity of an object, novel method steps for writing to and reading from the multilayer system result. The writing includes the steps of applying such a multilayer system to a substrate and subsequently writing to the multilayer system by specific changing of the bias of the domains for proving the authenticity. This method can be advantageous because it can be carried out only with increased effort and with the knowledge of modern scientific methods, which can increase the security against counterfeiting of the proof of authenticity.

For the reading of a proof of authenticity from a magnetic multilayer system there result, according to the invention, the method steps of providing a multilayer system for proving the authenticity of an object on a substrate associated therewith, of reading from the multilayer system and then inferring the authenticity of the object from the read proof. This method makes it possible to be able to check the authenticity of an object in an improved manner and can also have the advantage of being particularly secure against counterfeiting.

Preferred Configuration of the Invention

Advantageous developments which may be used individually or in combination with one another are the subject of the dependent claims.

It is preferred that the substrate is curved. A curved substrate is convexly or concavely shaped at least in the region in which it carries the multilayer system, and to be precise on the side on which the multilayer system is arranged.

In a preferred embodiment, the substrate is made of aluminium. The multilayer system may have been arranged on the latter as well as on all other substrates by epitaxy, laser ablation, sputtering, evaporation or a mixture of such or comparable methods. Such a substrate made of aluminium may be, for example, an aluminium foil or an aluminium block or in the broadest sense a moulding of aluminium. In this case, the substrate, as it may be curved too, may be present in a variety of forms. It may thus, for example, be a part for a motor vehicle, an aluminium rim or an exhaust system for example. An aircraft component and in general a machine component made of aluminium is also possible as the carrier for such a multilayer system. The advantage of this preferred embodiment may be that an object made of aluminium can be provided with a magnetic multilayer system. The stated and other objects may, however, also be composed of another metal and according to the invention serve as a substrate for a multilayer system.

A preferred substrate is a document. An example of such an embodiment would be a magnetic multilayer system on a banknote or a share certificate. An identity document issued officially or by a company or a will may also serve as a substrate. Accordingly, an authorisation such as a travel ticket, a boarding card or an admission ticket, known for concert halls, football stadiums or other areas with restricted access, or in general cards made of paper of any desired thickness, may also carry on them the magnetic multilayer system according to the invention. Documents made of materials other than paper may also be a substrate for the multilayer system according to the invention, for example documents which have been produced from plastics or metal alloys. In principle, any kind of document is possible as a substrate for the multilayer system.

In a preferred embodiment, the substrate is composed of an iron alloy. This can result in the advantage that an object made of an iron alloy can also carry the magnetic multilayer system. Thus, for example, the proof of authenticity of objects composed of iron alloys, for example parts for motor vehicles, can be improved. An appropriate iron alloy may be a steel, e.g. an alloyed or unalloyed high-grade steel or a stainless special steel or in particular a steel such as that used for vehicle spare parts made of steel. In this case, in particular spare parts which would be possible as a substrate for a magnetic multilayer system are those which perform a safety-related function in motor vehicles, for example brake discs, axles or suspension elements. But also other iron alloys would be possible as a substrate for a magnetic multilayer system according to the invention, for example cast iron. In principle, any object composed of an iron alloy can carry a multilayer system according to the invention.

In a preferred embodiment, the substrate for the multilayer system is packaging. In principle, any kind of packaging may comprise a multilayer system according to the invention. For example, packaging such as plastic films, cartons, or bottles or cans, are possible as a substrate. In particular, this is packaging such as sales packaging, secondary packaging, transport packaging, drinks packaging, reusable packaging, composite packaging and ancillary elements which hang directly on or are attached to a product and perform a packaging function, according to the German Packaging Ordinance, in particular Section 3, and Annex V thereof, as well as industrial packaging. As a result, novel possible uses for such a magnetic multilayer system can be achieved. Furthermore, a thin-film system can be improved by packaging as the substrate.

In a particularly preferred embodiment, the packaging is blister packaging. In this case, it can be embodied, for example, as welded packaging, flanged packaging or stapled packaging. It can comprise components made of a plastic, which may be composed, for example, from polypropylene. This plastic may be transparent and enable viewing of the packaged object. In this special case, the blister packaging would be transparent packaging. Other components of blister packaging may be made, for example, of paper, cardboard or paperboard, for example a back wall of blister packaging, or of aluminium, for example a sealing foil of blister packaging. Further components made of other materials are possible. It is, however, not necessary for all possible components to be present in blister packaging. For example, it may be composed solely of a plastic. The blister packaging may contain medicaments, i.e. for example a tablet blister. Alternatively, the blister packaging may also contain other objects, for example electronic products or safety-related automotive spare parts, such as brake discs or brake pads. What are referred to as safety-related parts would be those which are important for the roadworthiness of a motor vehicle. Such blister packaging may contain, in principle, any desired object for which it is suitable as packaging.

In a preferred embodiment, two magnetic layers are coupled to one another via the exchange bias effect. As a result of this, a particularly effective biasing of magnetic domains in a ferromagnetic layer in the multilayer system according to the invention can be achieved. The effect may occur particularly when a ferromagnetic layer lies against an antiferromagnetic layer. A ferromagnetic layer is a layer composed of a material having the property that it comprises adjacent elementary magnets whose spins are all orientated parallel to one another without applying an external field. For example, this property is exhibited by layers made of the elements Ni, Fe or Co or the compounds NiFe, CoNi, NiFeB, CoFeB, AlNiCo, SmCo, $Nd_2Fe_{14}B$ or NiFeCo. An antiferromagnetic layer is a layer composed of a material comprising the property that it has adjacent elementary magnets whose spins are all orientated antiparallel to one another without applying an external field. For example, this property is exhibited by layers made of the materials FeMn, NiMn, IrMn, PtMn, NiO, FeO, CoO and alloys of these materials. As a result of the exchange bias effect, a unidirectional anisotropy of the magnetisability, i.e. an asymmetry of the remagnetisation properties, can be brought about in the domains of the ferromagnetic layer. The exchange bias effect thus produces a preferred direction of the magnetisation in the ferromagnet, which is shown experimentally in a shift of the measured hysteresis curves along the magnetic field axis. Owing to the preference of a particular direction, the effect differs markedly from the customary ferromagnetic anisotropy, in which the orientation of the spins parallel and antiparallel to the preferred direction (easy direction) are energetically equivalent. This can be beneficial to the applicability of the multilayer system in the context of proving the authenticity of an object. Details on the effect of the exchange bias effect, suitable materials for multilayer systems with exchange bias effect and on the production of such multilayer systems can be found in Nogués et al., Exchange bias in nanostructures, Physics Reports 422, pp. 65-117 (2005). The content of this publication relating to the materials and their use in exchange bias systems is incorporated by reference in the present disclosure.

In a preferred embodiment, a non-magnetic layer is located between two magnetic layers. A non-magnetic layer may be composed, for example, of the elements Au, Ag, Al, Cu, but also of oxidic materials. A non-magnetic layer may be located in particular between two ferromagnetic layers. This enables the production of a multilayer system according to the invention, in which a biasing of the ferromagnetic layer may take place on the basis of the interlayer exchange coupling. Such principles are known from multilayer systems in which tunnel magnetoresistance (TMR) or giant magnetoresistance (GMR) effects are observed, for example spin-valve systems. Such a system may be based on the exchange bias effect, but need not be. Details on suitable materials and production processes for such multilayer systems which exhibit interlayer exchange coupling can likewise be found in Nogués et al., Exchange bias in nanostructures, Physics Reports 422 (2005). The content of this publication relating to the materials and their use in systems with interlayer exchange coupling is incorporated by reference in the present disclosure.

In another preferred embodiment, no magnetic layer is antiferromagnetic. In this case, two ferromagnetic layers are alternately separated by a non-magnetic layer, for example composed of Au or Ag. The layers may be deposited repeatedly on one another. A preferred embodiment comprises at least ten layers, particularly preferably at least 35, further particularly preferably at least 45. A preferred embodiment comprises, moreover, at most 100, particularly preferably at most 80, further particularly preferably at most 65, further particularly preferably at most 50 layers. This allows advantageously the writing of alternating out-of-plane domain patterns. Preferred embodiment comprises at least one, particularly preferably at least two, further particularly preferably at least five, further particularly preferably at least 8 layers and preferably at most 15 layers, particularly preferably at most 13, further particularly preferably at most 10 layers. This allows advantageously the writing of domain patterns with alternating out-of-plane and in-plane orientated domains. It is thus possible to produce in each case multilayer systems with a large number of layers, the magnetic layers of which immediately after the completion of the multilayer system have domains that have a random pattern. A high number of information items can be stored therein, which can have a beneficial effect, for example, on the security against counterfeiting in the context of using the multilayer system to prove the authenticity of an object. Such a magnetic multilayer system without an antiferromagnetic layer is described in detail in Urbaniak et al., Domain structure and magnetoresistance of NiFe/Au/Co/Au multilayers with perpendicular anisotropy, Phys. Stat. Sol. (c) 3, No. 1, pp. 57-60 (2006). The content of this publication relating to the materials and their use in such magnetic multilayer systems without an antiferromagnetic layer is incorporated by reference in the present disclosure.

In a preferred embodiment, a boundary layer of the multilayer system is a growth layer. It can enable a particularly advantageous multilayer system to be produced by providing a lattice structure between a magnetic layer and a substrate material or reducing mechanical stresses between the substrate and the multilayer system. Suitable materials for a growth layer may be, for example, but not only, Ta, Au, Cu, NiFe or CoFe. Another possible boundary layer may be a covering layer with a thickness of between 2 nm and 1 µm, particularly preferably between 20 nm and 200 nm. It can protect the multilayer system from mechanical damage, oxidation, moisture or change, if this is to be prevented. The covering layer may, however, also be omitted or have a different thickness or a varying thickness, if this seems appropriate for given reasons. Suitable materials for a covering layer may be, for example, but not only, Al, Si, Au or Ta, or other metals or polymers, for example lacquers.

In a preferred embodiment, the biased domains have biases differing in magnitude and/or direction. This can have the advantage that the domains can thus be differentiated in many respects on the basis of various distinguishable magnetic properties, which can allow the domains to be respectively assigned their own information value based on their individual magnetic properties. A particularly high information depth in the multilayer system can thus be achieved.

In a preferred embodiment, the biased domains have an artificially generated pattern. Artificial in the meaning of the invention is a pattern which is not naturally present in the domains, but has been permanently generated by external influencing of the domains caused intentionally. The patterns can be spatially sharply defined, and their individual magnetisations can have different intensities and anisotropy directions. For example, adjacent domains can be orientated head-to-head (H2H) or tail-to-tail (T2T), or side-by-side (SbS), so that the spins in these domains are orientated clearly distinguishably. Combinations of such orientations are also possible in a layer. For example, the artificially generated pattern may be a special image or a shape or a code such as a binary code or a hexadecimal code. For example, in a multilayer system with a large number of ferromagnetic layers, between each of which is located a non-magnetic layer, in which system, therefore, non-magnetic and ferromagnetic layers alternate with one another, or in a system with a ferromagnetic layer which is coupled via the exchange bias effect to an antiferromagnetic layer, a three-dimensional magnetic pattern (3D pattern) can be written in. This would mean artificially ordering the usually random pattern of the magnetic domains in such a multilayer system. Alternatively, it is also possible to apply aerially a two-dimensional pattern (2D pattern) in a ferromagnetic layer, for example in a chequerboard-like configuration, or a one-dimensional pattern (1D pattern), in which the domains are arranged like a barcode. The advantage of such an artificially generated pattern can be that the pattern can be used in the domains of the magnetic multi-layer system to prove the authenticity of an object.

In a preferred embodiment, the asymmetrical magnetising properties of the biased domains can be changed by ion bombardment. For example, bombardment with He or H ions is possible, whereby, usually dose-dependently, only the domain magnetisation, or else the physical layer structure per se can be influenced, and through the latter the coupling effects between the layers can be completely suppressed. In principle, however, all other types of ions are also possible. For example, it may be possible to change the anisotropy direction of the domains when bombarding the multilayer system with ions while applying an external magnetic field. In this case, both a targeted bombardment of individual domains is conceivable, and an areal bombardment, in which particular regions can be excluded from a magnetic reversal by suitable covers. The selective magnetic reversal can have a particularly advantageous effect, because it can thus be made possible to achieve a particularly greatly increased information depth, for example because each individual magnetisation can be assigned to an information value. Suitable procedures for changing the domain structure are described in detail in J. Fassbender et al., "Magnetization Reversal of Exchange Bias Double Layers Magnetically Patterned by Ion Irradiation" 2002, Phys. Stat. Sol (a) 189, 439; A. Mougin et al., "Magnetic micropatterning of FeNi/FeMn exchange bias bilayers by ion irradiation", 2001, J. Appl. Phys 89, 6606; A. Ehresmann "He-ion bombardment induced exchange bias modifications: Fundamentals and applications" 2004, Recent Res. Devel. Applied Phys. 7, 401; K. Theis-Bröhl et al., "Exchange-bias instability in a bilayer with an ion-beam imprinted stripe pattern of ferromagnetic/antiferromagnetic interfaces" 2006, Phys. Rev. B 73, 174408; or A. Ehresmann et al., "On the origin of ion bombardment induced Exchange Bias modifications in polycrystalline layers" 2005, J. Phys. D. 38, 801.

In a preferred embodiment, the biased domains with asymmetrical remagnetisation properties show a hysteresis shift $H_B$ with a magnitude of at most 100 mT. This may be advantageous in order to be able to simplify the reading of the magnetisation properties of the domains.

In a preferred embodiment, the biased domains have a lateral dimension of between 50 nm and 5 mm. A lateral dimension is the length of a line running through the domains orthogonally starting from any point of the edge of a domain up to its point of intersection with another point of the edge of a domain. In this case, only one of the lateral dimensions has to come from the specified range. That is to say, other lateral dimensions of a domain may have any lengths. Arranged side by side, the domains form a pattern corresponding to an invisible barcode, where each bar of the barcode corresponds to a domain with a lateral dimension from the specified range. The lateral dimension of all the domains may be the same or different. It may be particularly advantageous that the small lateral dimensions can allow a large number of domains per multilayer system and thus a particularly high information density can be achieved. Alternatively, the number of domains may also be kept small, whereupon the area of the multilayer system can be reduced and this can enable a multilayer system with a very small space requirement.

In a particularly preferred embodiment, the biased domains have a lateral dimension of between 10 µm and 100 µm. Arranged side by side, the domains can advantageously form a pattern corresponding, for example, to a barcode, where each bar of the barcode has a lateral dimension from the specified range. Domains with such dimensions can be more easily producible for series production.

In a further particularly preferred embodiment, the biased domains have a lateral dimension of between 25 μm and 100 μm. Arranged side by side, the domains can advantageously form a pattern corresponding, for example, to a barcode, where each bar of the barcode has a lateral dimension from the specified range. Domains with such dimensions can have the advantage that they can be read particularly easily, for example using the CMOS MagView method.

Preferably, if the substrate is a plastic from the group of polymers, the polymer is polypropylene. Polypropylene is a very common polymer and therefore available at low cost. In addition, polypropylene has in everyday temperature ranges, for example between 0° C. and 100° C., good strength, is easily shapeable and it is resistant to many chemicals. It is also used as a material for automotive parts, for example, which are to be provided with a magnetic authenticity feature. Therefore, it is particularly suitable as a substrate. But instead of polypropylene, other polymers, for example polyethene (PE), polybutadiene, polystyrene, polyvinyl chloride (PVC), polyacrylonitrile (PAN), polytetrafluoroethene (Teflon) and polyacrylates, are also possible as the substrate from the group of polymers.

When using a magnetic multilayer system, comprising a plurality of magnetic layers arranged one upon another, for proving the authenticity of an object, it is preferred that the bias of domains is changed by ion bombardment. This can have the advantage as described above that detailed, possibly multidimensional domain patterns can be stored without damaging the multilayer system.

When using a magnetic multilayer system, comprising a plurality of magnetic layers arranged one upon another, for proving the authenticity of an object, it is preferred that a reading device is used to prove the authenticity of an object based on the domain magnetisation in a magnetic multilayer system which is arranged on the object and/or its packaging. The multilayer system is arranged on a physical object to be marked as authentic and marks the object as authentic owing to its specific domain magnetisation. The reading device is capable of reading the domain magnetisation and further processing the read information or passing it on for further processing. The advantage which can be achieved by this is that, by reading the magnetic multilayer system, conclusions can be drawn about the authenticity of the object associated therewith.

In a method for marking an object for proving the authenticity of an object, it is preferred that the bias of domains is changed by ion bombardment, as described above. This can be particularly advantageous, because the bias of the domains, which arises for example owing to the interfacial properties between the ferromagnetic and antiferromagnetic layer, can be specifically influenced by the ion bombardment. Thus, specific, desired patterns with intended magnetic properties can be produced, which allow the storage of a high information depth without damaging the multilayer system.

In a method for marking an object for proving the authenticity of an object, it is furthermore preferred that the multilayer system is applied to a substrate which is an object to be marked with the authenticity information or is packaging associated with the object. The direct application can be advantageous, because this makes it more difficult to remove or copy the multilayer system. For example, the multilayer system can be applied directly to an automotive spare part, so that the multilayer system is very difficult to copy. This aspect may be particularly important, because creating or copying a magnetic multilayer system may require special technical equipment and advanced scientific knowledge, especially if it is intended to provide precisely defined information. It is, however, also possible for the manufacturer to arrange a magnetic multilayer system on a glass bottle or a medicament blister containing a medicine and, before or after that, provide it with authenticity information by ion bombardment. The glass bottle or the medicament blister can then be delivered to a pharmacist, who can read the information from the multilayer system using a suitable reading device and verify it using appropriate check information. Thus, the contents of the bottle or medicament blister can be identified as original medicine. Of course, any other physical object would also be possible for carrying such a magnetic multilayer system with stored authenticity information, which can then be read by a dealer, a governmental institution or someone else, to check the authenticity of the object.

In a method for marking an object for proving the authenticity of an object, it is alternatively preferred that the substrate to which the multilayer system is applied is a label. This is advantageous when an application to the actual object to be marked is difficult or impossible, for example because its surface does not allow the application of a magnetic multilayer system. In such cases, a labelling with such a multilayer system can be advantageous. Suitable labels may be, for example, self-adhesive labels made of paper or paperboard or labels in the form of a tag, e.g. a price marking, or a patch. Such a label may also be in particular a bottle or can label made of paper or plastic.

In a method for reading a magnetic multilayer system for proving the authenticity of an object, it is preferred that the stray-field direction or the change of the stray-field intensity of the domains are determined location-dependently using the reading device by means of magnetoresistive methods. This magnetic information can subsequently be transformed, for example, into zeros and ones or otherwise distinguishable and further-processable information. A reading may, however, also be carried out, for example, by using the magneto-optic Kerr effect (MOKE). Here, use is made of the physical effect that magnetised domains can influence incident light in its properties, so that via the change of the optical properties of the light, for example of a laser beam, conclusions can be drawn about the magnetic properties of the domains. This solution can have the advantage that movable parts in the reading device can be dispensed with. Alternatively, however, it is also possible to use, for example, the CMOS MagView method, in which the entire barcode is imaged onto a CCD array by an expanded laser beam, in order to be able to detect the rotation of the polarisation plane of the reflected light depending on the magnetic field.

BRIEF DESCRIPTION OF THE DRAWINGS

Further advantageous configurations of the invention are described in more detail below with the aid of exemplary embodiments illustrated in the drawings, to which the invention is, however, not limited.

In the drawings.

DETAILED DESCRIPTION OF EMBODIMENTS OF THE INVENTION

Figure 1:
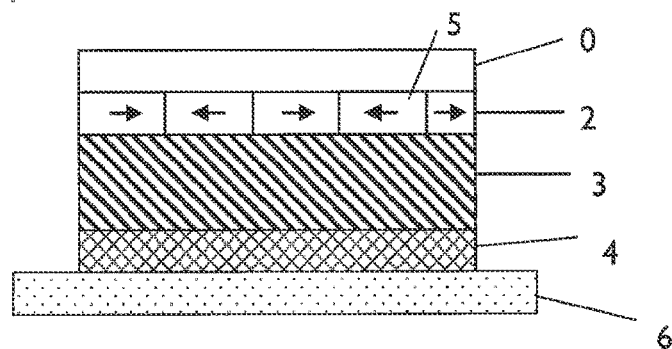
FIGS. 1 and 2 schematically show a cross-section through a multilayer system according to the invention with four layers.
Figure 2:
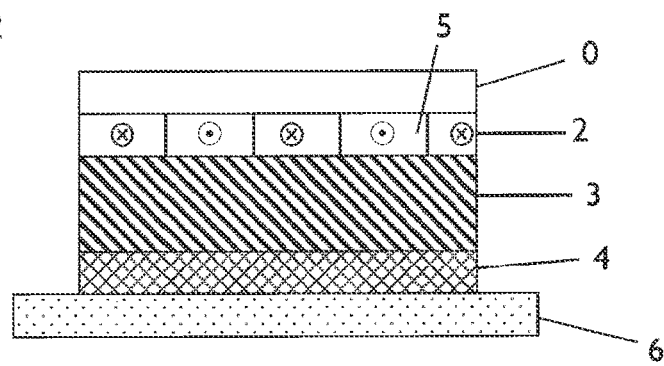

FIGS. 1 and 2 each show a multilayer system (1) according to the invention with four layers (0, 2, 3, 4). The uppermost of the depicted layers is a covering layer (0) made of gold, the layer second from the top is a ferromagnetic layer (2), in this case made of CoFe. It is located on an antiferromagnetic layer (3) made of IrMn. The two magnetic layers (2, 3) are located on a growth layer (4) composed of gold. The multilayer system (1) is arranged on a plane paper substrate (6), in this case a banknote. The antiferromagnetic layer (3) and the ferromagnetic layer (2) are coupled by the exchange bias effect, and therefore the domains (5) exhibit an asymmetrical remagnetisation behaviour. Their hysteresis shift is e.g. 25 mT. The ferromagnetic layer (2) has a large number of biased domains (5, schematic illustration) which exhibit different biases. The bias of the domains (5) has been permanently changed by He or H ion bombardment. The domains (5) have been artificially H2H-/T2T-orientated (FIG. 1) or SbS-orientated (FIG. 2) and as result a pattern with a constant lateral width of e.g. 50 µm per domain has been produced. The orientation of the domains (5) has been fixed by applying an external magnetic field, simultaneously with the ion bombardment, which field has rotated the respectively bombarded domains (5) into the desired direction. The described specific magnetic reversal of the domains (5) has been carried out to prove the authenticity of the banknote and the magnetisation of the domains (5) can be read by a suitable reading device. In this way, an improved ability to detect counterfeit money is made available.

Figure 3:
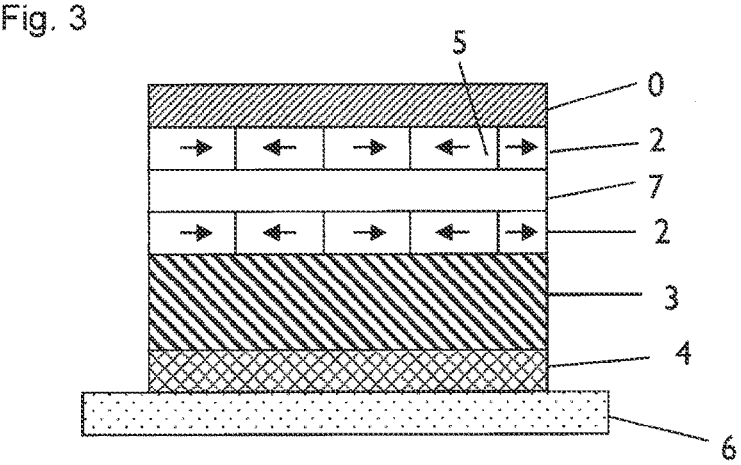
FIG. 3 schematically shows a cross-section through a multilayer system according to the invention with six layers.

FIG. 3 shows a multilayer system (1) according to the invention with six layers (0, 2, 3, 4, 7). It comprises two ferromagnetic layers (2) which are separated from one another by a non-magnetic layer (7). The lower of the two ferromagnetic layers is adjacent to an antiferromagnetic layer (3), to which it is coupled by the exchange bias effect. For this reason, the domains (5) of the lower ferromagnetic layer (2) are biased and pinned in one direction. The magnetisation of the upper ferromagnetic layer (2), by contrast, can be rotated by an external magnetic field and by ion bombardment according to the principle of the spin valve. The domain magnetisation has been specifically changed to prove the authenticity of an object. The multilayer system (1) is likewise arranged on a plane substrate (6) which in this case is composed of the plastic polypropylene and forms blister packaging. A covering layer (0) made of gold protects the multilayer system (1) from oxidation. Blister packaging of a counterfeit product can thus be distinguished in an improved manner from blister packaging of an original product.

Figure 4:
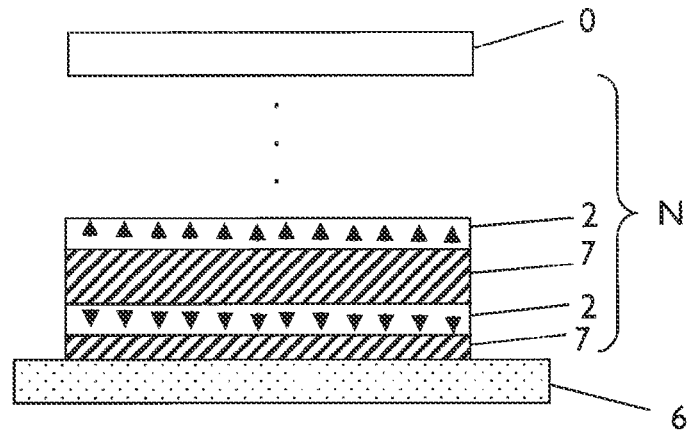
FIGS. 4 and 5 schematically show a cross-section through a multilayer system according to the invention with five illustrated layers without an antiferromagnetic layer.
Figure 5:
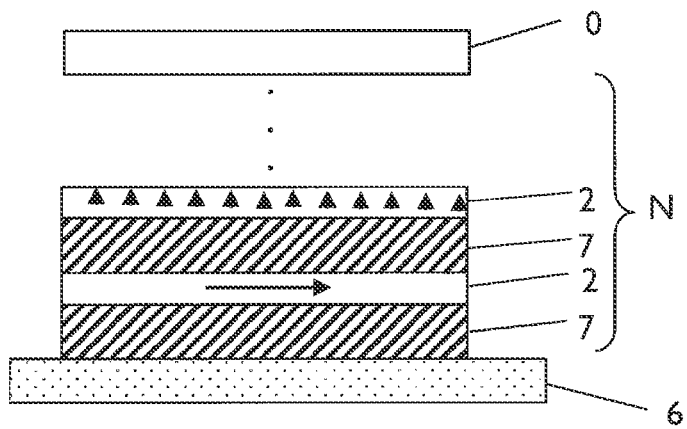

FIGS. 4 and 5 each show a detail of a multilayer system (1) according to the invention with a large number N of alternating layers (2, 7). Four of these are shown. In the multilayer system (1) from FIG. 4 approximately N=50 layers are present, in FIG. 5 approximately N=10 layers. Ferromagnetic layers (2) and non-magnetic layers (7) alternate with one another and are coupled to one another via interlayer exchange coupling. The ferromagnetic layers (2) may be composed of different ferromagnetic materials in each case, in the multilayer system (1) from FIG. 4, for example, alternately of Co and CoFe. The non-magnetic layer (7) in the multilayer system from FIG. 4 may be composed, for example, of Pt or Pd. In the multilayer system (1) from FIG. 5, the ferromagnetic layers (2) may be composed, for example, of Co or NiFe, the non-magnetic layers (7) of gold. They are arranged on a substrate curved perpendicularly to the sectional plane and made of stainless steel, such as is found in components for motor vehicles (not shown) and are protected by a covering layer (0) as the uppermost layer, in this case made of aluminium. By bombardment with ion radiation, the domains can be specifically orientated and influenced in their magnetic properties. The normally random domain patterns of the different ferromagnetic layers (2) can thereby be brought into any desired order, in FIG. 4 alternating out-of-plane, in FIG. 5 alternating in-plane (NiFe layer), out-of-plane (Co layer). The individual magnetic orientation can be interpreted as information by using a reading device, and therefore the multilayer system (1) is used to prove the authenticity of the steel element. It is thus possible to distinguish a genuine steel element made of high-quality steel in an improved manner from a counterfeit steel element made of low-quality steel.

Figure 6:
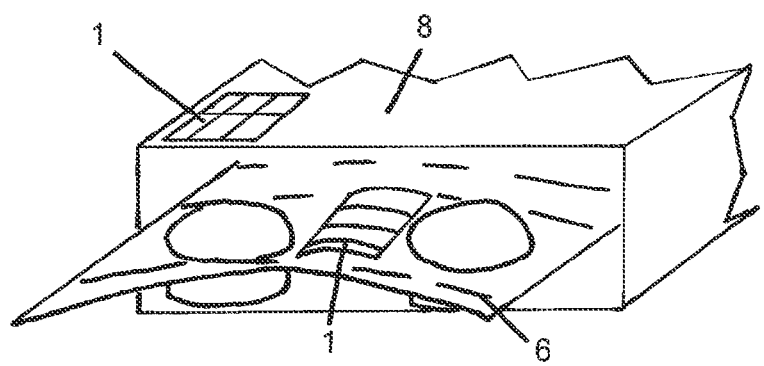
FIG. 6 schematically shows a use of a multilayer system according to the invention on an object, for proving the authenticity of an object, in a perspective sketch.

FIG. 6 shows a use of a multilayer system (1) according to the invention on a physical object for proving its authenticity. The multilayer system (1) is arranged on a substrate (6), in this case a sealing foil of a medicament blister. The blister is curved and its sealing foil is composed of metal, in this case aluminium. The multilayer system (1) has been written to with a characteristic artificial pattern, after the application of the sealing foil, by He ion bombardment with simultaneous application of a magnetic field to prove the authenticity of the medicaments. If the domain magnetisation is read using a suitable reading device, authenticity is confirmed in the event of information from the multilayer system (1) corresponding to check information. If the comparison with the check information fails, the authentication fails. As illustrated, the medicament secondary packaging (8) made of cardboard can also provide a multilayer system (1) according to the invention, so that authenticity information regarding the medicaments contained can be stored not solely on the blister itself, but also on the medicament secondary packaging (8). There is thus provided an improved ability to distinguish original medicaments from counterfeit medicaments with poor or insufficient efficacy.

LIST OF REFERENCE SYMBOLS

0 non-magnetic covering layer
1 multilayer system
2 ferromagnetic layer
3 antiferromagnetic layer
4 growth layer
5 magnetic domain
6 substrate
7 non-magnetic layer
8 medicament secondary packaging

The invention claimed is:

1. A multilayer system (1), comprising a plurality of magnetic layers which are arranged one upon another and of which at least two layers are ferromagnetic and a ferromagnetic layer (2) has a large number of biased domains (5) with asymmetrical remagnetisation properties, the multilayer system being arranged on a substrate (6), wherein the substrate (6) is defined by at least one of the following:

(a) the substrate (6) comprising a material selected from the group consisting of (i) a plastic selected from the group of polymers and (ii) paper;
(b) the substrate (6) being curved;
(c) the substrate being at least one element selected from the group consisting of a document and packaging; and
wherein two of the ferromagnetic layers (2) are separated by a non-magnetic layer (7),
wherein one of the two ferromagnetic layers (2) is adjacent to an antiferromagnetic layer (3), to which it is coupled by the exchange bias effect.

2. The multilayer system (1) according to claim 1, wherein the substrate (6) is curved.

3. The multilayer system according to claim 1, wherein the substrate (6) is made of aluminium.

4. The multilayer system according to claim 1, wherein the substrate (6) is a document.

5. The multilayer system (1) according to claim 1, wherein the plastic from the group of polymers is polypropylene.

6. The multilayer system (1) according to claim 1, wherein the biased domains (5) have an artificially generated pattern.

7. The multilayer system (1) according to claim 1, wherein the substrate (6) comprises an iron alloy.

8. The multilayer system (1) according to claim 1, wherein the substrate (6) is packaging.

9. The multilayer system (1) according to claim 8, wherein the packaging is blister packaging.

10. The multilayer system (1) according to claim 1, wherein ferromagnetic layers (2) and non-magnetic layers (7) are alternatingly stacked.

11. A method for marking an object with a magnetic multilayer system for proving the authenticity of an object, comprising:
applying a magnetic multilayer system (1) to a substrate (6), wherein the substrate is characterized by at least one of the following:
(a) the substrate comprising a material selected from the group consisting of (i) a plastic selected from the group of polymers, (ii) a metal, (iii) a metal alloy and (iv) paper; and
(b) the substrate (6) being curved; and
(c) the substrate being at least one element selected from the group consisting of a document and packaging; and
wherein the multilayer system (1) comprises two ferromagnetic layers (2) separated by a non-magnetic layer (7), wherein one of the ferromagnetic layers (2) is adjacent to an antiferromagnetic layer (3), to which it is coupled by the exchange bias effect; and
changing the bias of magnetic domains in the multilayer system for proving the authenticity of the object (5).

12. The method according to claim 11, wherein the bias of domains (5) is changed by ion bombardment.

13. A method for reading a magnetic multilayer system (1) for proving the authenticity of an object, comprising:
providing a multilayer system (1) on a substrate (6) for proving the authenticity of the substrate, wherein the substrate is characterized by at least one of the following:
(a) the substrate comprising a material selected form the group consisting of (i) a plastic selected from the group of polymers, (ii) a metal, (iii) a metal alloy and (iv) paper; and
(b) the substrate (6) being curved; and
(c) the substrate being at least one element selected form the group consisting of a document and packaging; and
wherein the multilayer system (1) comprises two ferromagnetic layers (2) separated by a non-magnetic layer (7), wherein one of the ferromagnetic layers (2) is adjacent to an antiferromagnetic layer (3), to which it is coupled by the exchange bias effect;
reading the multilayer system; and
inferring the authenticity from the read proof.

\* \* \* \* \*